United States Patent
Curry

(10) Patent No.: US 12,132,869 B2
(45) Date of Patent: Oct. 29, 2024

(54) PHONE INTERFACE SYSTEM

(71) Applicant: Damon Curry, Beavercreek, OH (US)

(72) Inventor: Damon Curry, Beavercreek, OH (US)

( * ) Notice: Subject to any disclaimer, the term of this patent is extended or adjusted under 35 U.S.C. 154(b) by 0 days.

(21) Appl. No.: 17/458,528

(22) Filed: Aug. 26, 2021

(65) Prior Publication Data

US 2022/0070299 A1    Mar. 3, 2022

Related U.S. Application Data

(60) Provisional application No. 63/070,660, filed on Aug. 26, 2020.

(51) Int. Cl.
*H04W 4/00* (2018.01)
*H04M 3/436* (2006.01)
*H04M 7/00* (2006.01)

(52) U.S. Cl.
CPC ....... *H04M 7/0069* (2013.01); *H04M 3/4365* (2013.01)

(58) Field of Classification Search
CPC ...... H04M 3/436; H04M 1/663; H04M 1/673; H04M 1/66
See application file for complete search history.

(56) References Cited

U.S. PATENT DOCUMENTS

| | | | |
|---|---|---|---|
| 6,456,706 B1* | 9/2002 | Blood | H04M 1/663 379/188 |
| 2004/0161085 A1* | 8/2004 | Horne | H04M 1/663 379/142.01 |
| 2011/0026699 A1* | 2/2011 | Amir | H04M 15/06 704/E15.001 |
| 2014/0219430 A1* | 8/2014 | Daniel | H04M 3/42068 379/142.05 |
| 2014/0267112 A1* | 9/2014 | Dunn | G08B 13/19689 345/173 |
| 2016/0171467 A1* | 6/2016 | Johnson | G06F 3/0484 705/43 |
| 2021/0314440 A1* | 10/2021 | Matias | H04M 3/42136 |

* cited by examiner

*Primary Examiner* — Omoniyi Obayanju
(74) *Attorney, Agent, or Firm* — Maxwell L. Minch Esq. P.A.; Maxwell L. Minch

(57) ABSTRACT

The present invention provides for phone interface systems providing for the elderly. The present invention provides for a telephone management system blending landline technology with landline or cell phone networks, and bridging the technology and functionality gap for seniors. Aspects of the invention provide for network interface systems which include interfaces for allowing use of landline systems with cellular technology, providing video displays to allow for touch access to numbers, and to synch actuators and sensors with the interface system.

13 Claims, 5 Drawing Sheets

PHONE INTERFACE SYSTEM

CROSS-REFERENCE TO RELATED APPLICATIONS

This application claims the benefit of U.S. Provisional Application No. 63/070,660, having a filing date of Aug. 26, 2020, the disclosure of which is hereby incorporated by reference in its entirety and all commonly owned.

FIELD OF THE INVENTION

The present invention relates in general to phone interface systems, and in particular phone interface systems for interfacing with cellular or non-cellular telephone systems to a microprocessor-driven automated electronic device for communication monitoring and assistance.

BACKGROUND OF THE INVENTION

Individuals living in the "sandwich generation" frequently encounter complications when it comes to incorporating technology into the lives of their elder parents. Being split between their own families and assisting with their aging parents, these individuals often seek assistance to best manage their time and energy. Mobile devices and other technologies can provide a suitable bridge to assist individuals, however problems arise because much of this technology requires interfacing by the elderly who have trouble adapting to the rapid advancements in technology, and inability to manipulate the touch screen and/or controls.

Complications further arise if the elder or other users are suffering from injuries or disease which affect their fine motor skills, such as Parkinson's disease. In addition, complications arise generally as a result of poor eyesight because of the typically small user interfaces. Elderly persons often are unfamiliar with and therefore reluctant to use devices as complex as a modern smart phone. Thus there remains an unmet need to bridge elderly persons with technology to allow for improved communication and better care.

Some attempts have been made to improve the relationship with elderly individuals and technology. This includes, limiting the number of icons present on a screen, adjusting icon and lettering sizes, and providing magnification features for the displays. However, these solutions present new problems, especially when application notifications, often very technical, are received through the devices, where the applications themselves have not been adapted. Accordingly push notifications to upgrade software, or worse, to sign up for unintended services, remain a challenge for the elderly even with current attempts to make use of newer technology easier.

Other attempts by cellular providers have been made which offer special phones for seniors or handicapped persons who aren't comfortable with other modern cell phones. These special phones simply implement the features discussed above (e.g. larger buttons, limitation of icons, larger icons and keypad). Worse, many of these cell phones cannot be incorporated on a family mobile device plan except the plan offered by the phone provider, thus costing seniors 2 to 3 times more, which can be significant on the fixed incomes of most seniors. Thus there remains an unmet need for a mobile solution which allows for the cost savings of being able to use any carrier, and taking advantage of family plans and networks, with a user interface that's comfortable to an elderly or handicapped user.

When polled, most seniors still prefer the use of landline telephones. Getting service for landline telephones is relatively common and easy, however problems still arise, requiring a solution, when it comes to the elderly remembering the important numbers to be dialed, assistance in taking phone messages, and contacting emergency providers. Attempts have been made to include landline phone systems which have preprogrammed numbers, or lists beside the phone, but problems still arise with reading the information next to the preprogrammed numbers or reading the list. In addition, because in some instances seniors are slower to get to the phone, many missed important calls occur. Thus there remains an unmet need for a telephone management system blending landline technology with landline or cell phone networks, and bridging the technology and functionality gap for seniors.

SUMMARY OF INVENTION

The present invention provides for phone interface systems providing for the elderly. The present invention provides for a telephone management system blending landline technology with landline or cell phone networks, and bridging the technology and functionality gap for seniors. Aspects of the invention provide for network interface systems which include interfaces for allowing use of landline systems with cellular technology, providing video displays to allow for touch access to numbers, and to synch actuators and sensors with the interface system.

Aspects of the proposed device will be able to act as an automated telephone operator to block calls from spammers. Certain embodiments answer an incoming call without notifying the called person, then require the caller to enter a numeric code that, if correctly entered, would cause the telephone device to ring so the caller and the calling party could be connected.

Other aspects is that the present invention acts as a "bridge" between landline and cell phone devices and networks.

BRIEF DESCRIPTION OF THE DRAWINGS

Examples illustrative of embodiments of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings. The figures (Figs.) are listed below.

Figure 1:
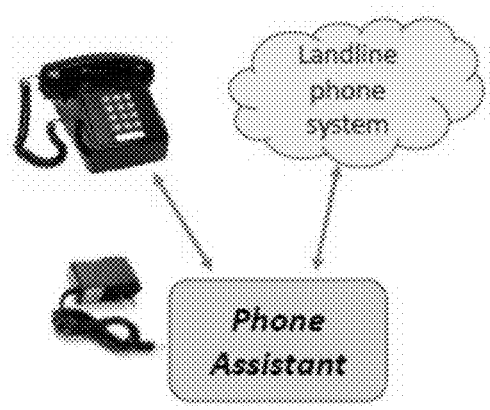
FIG. 1 provides a block diagram of one embodiment of the phone interface system where a landline telephone is implemented for use with the invention, where the invention serves as an intermediary assistant to the user.
Figure 2:
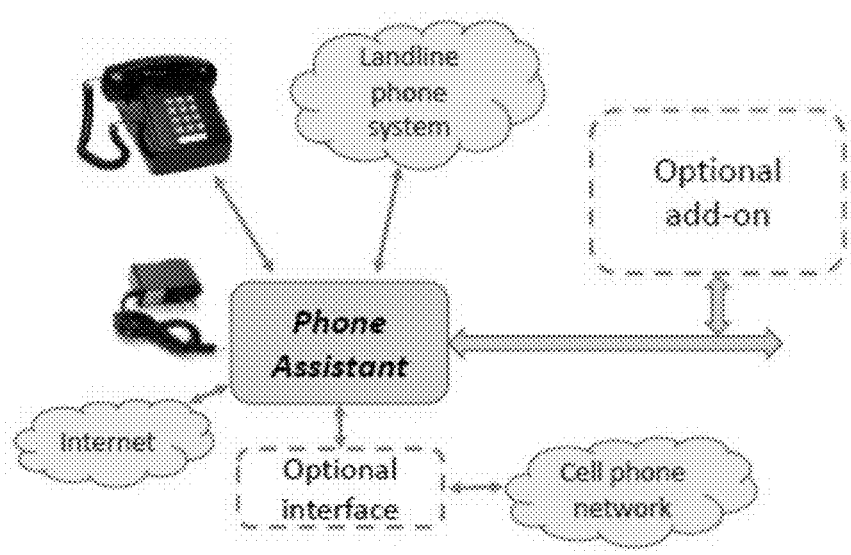
FIG. 2 illustrates the invention in an expanded configuration compared to FIG. 1, bridging the traditional landline telephone device with a cell phone network and also connecting to the Internet.
Figure 3:
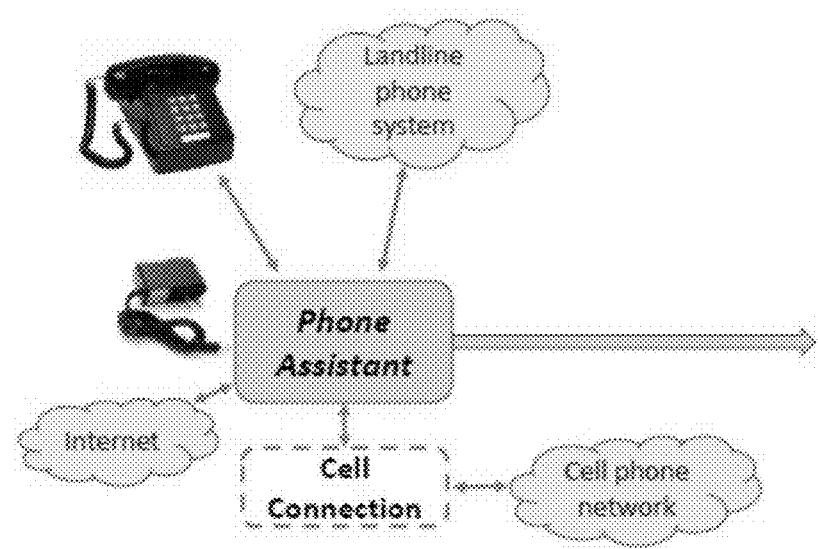
FIG. 3 illustrates the invention in a further expanded configuration compared to FIG. 2, bridging the traditional landline telephone device with a cell phone network and also connecting to the Internet, and showing addition of other optional components . . . .
Figure 4:
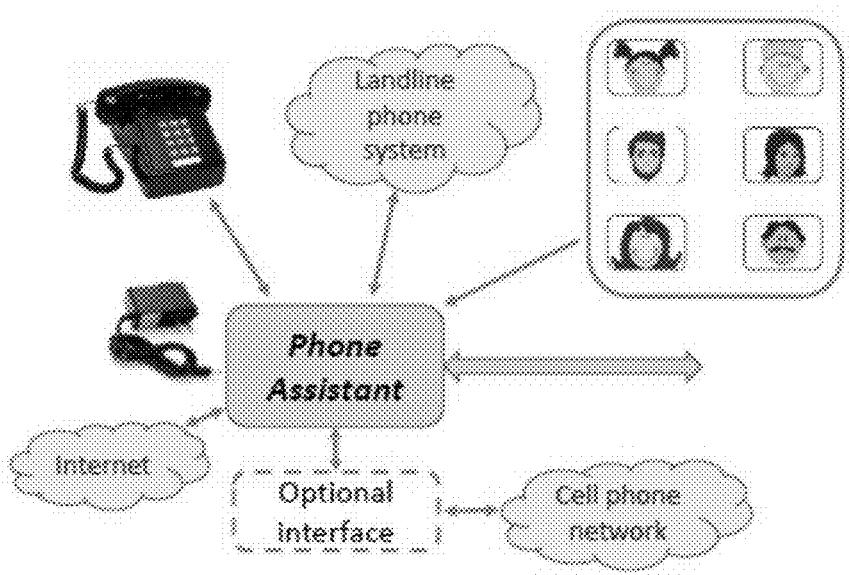
FIG. 4 expands on FIG. 3 with addition of a video display that makes the user interface easier and better for many users, with features such as display of emergency numbers to be dialed.
Figure 5:
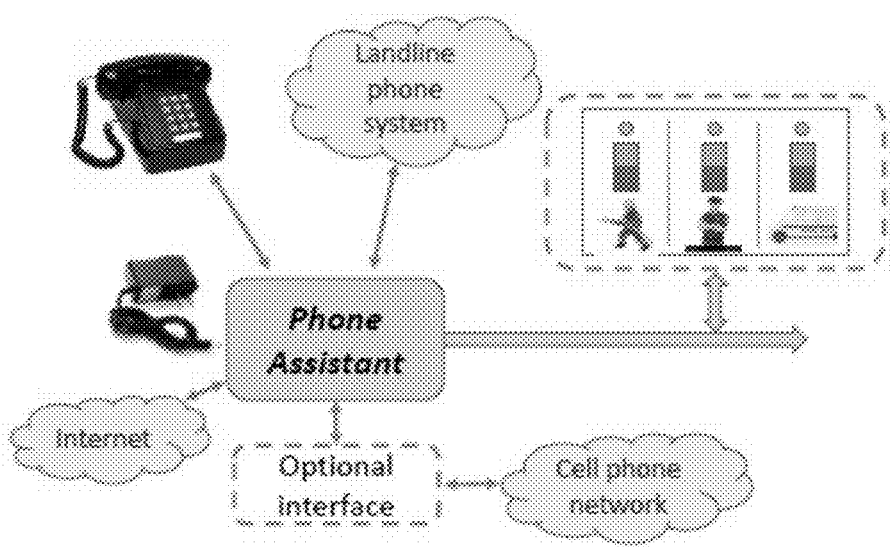
FIG. 5 expands on FIG. 3 with addition of a video display that makes the user interface easier and better for many users, with features such as display of photos of persons either calling or to be dialed.
Figure 6:
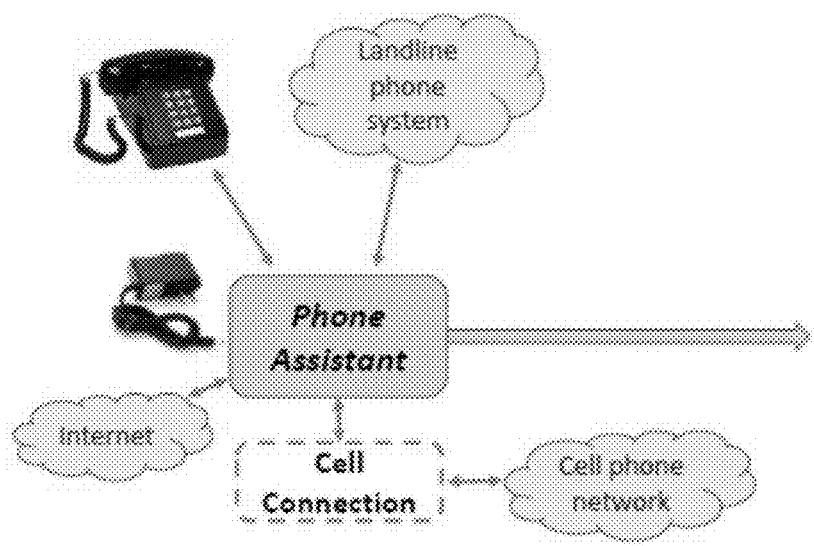
FIG. 6 expands on FIG. 2 with addition of a cellular connection and cell phone network allowing the phone assistant to bridge landline technology with a cellular network.
Figure 7:
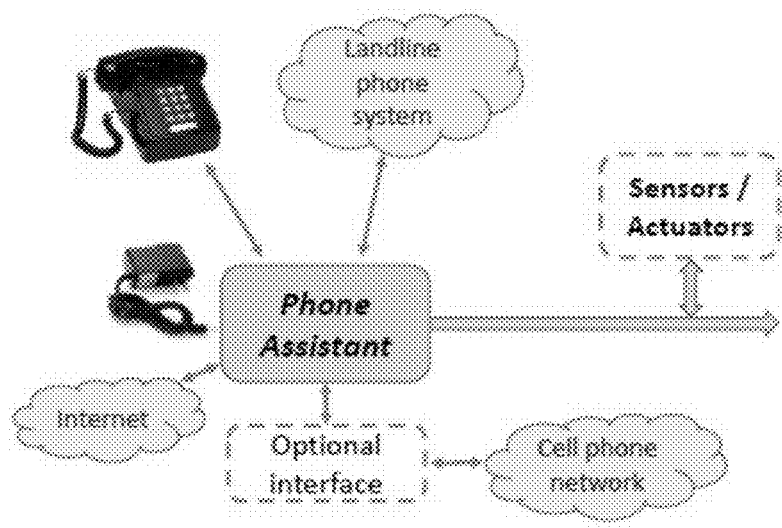
FIG. 7 expands on FIG. 3 with addition of sensors and actuators.
Figure 8:
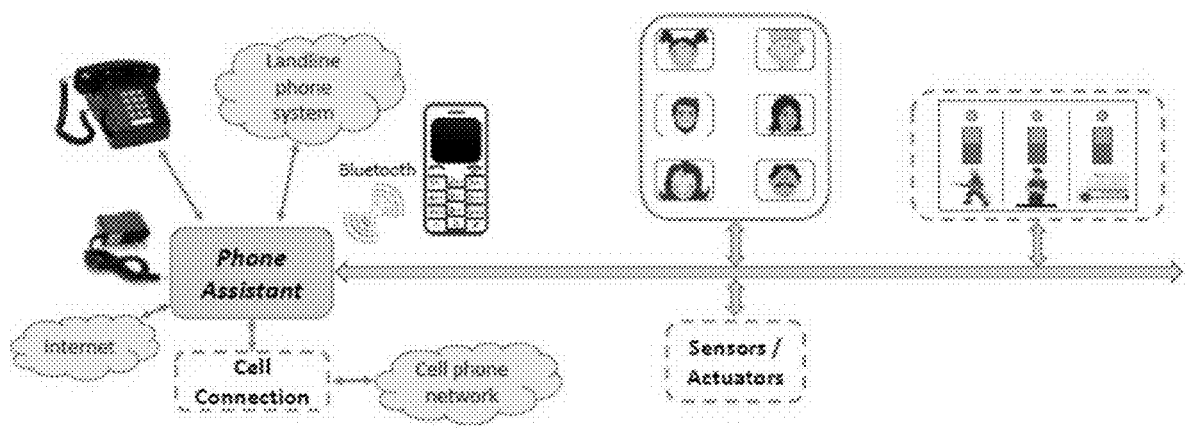
FIG. 8 illustrates a system overview diagram showing how the inventive phone interface system is being implemented.
Figure 9:
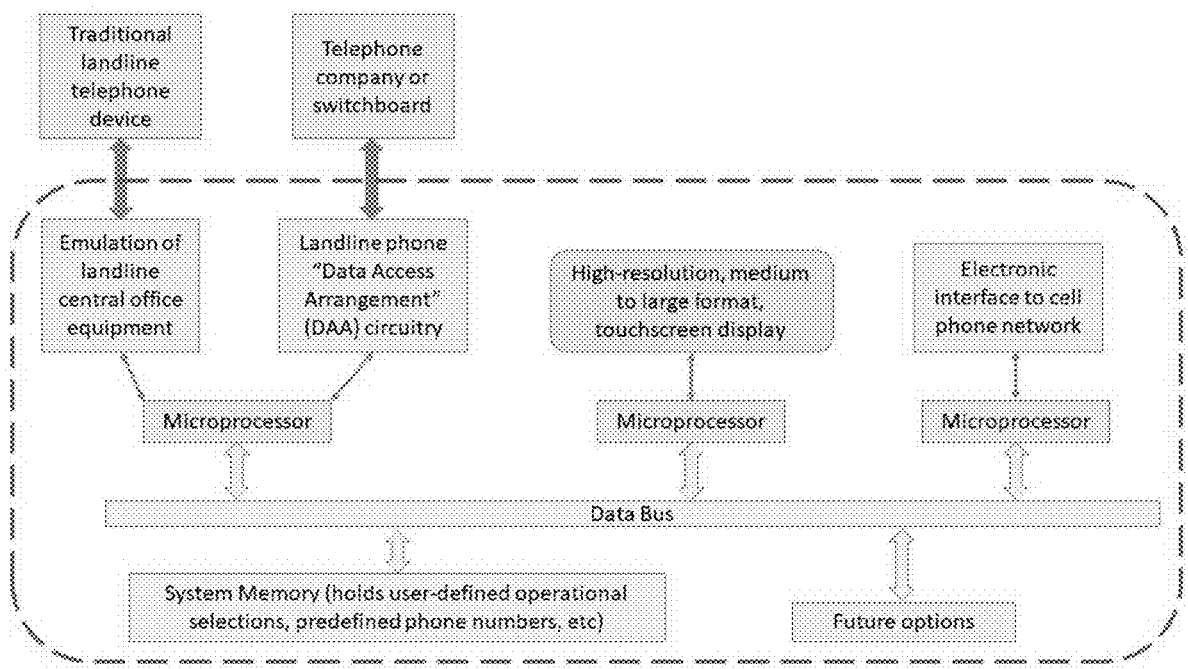

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

DETAILED DESCRIPTION OF THE INVENTION

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

The present invention contains the features of a telephone interface systems as herein described.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

General

The present invention provides embodiments of one or more telephone interface systems for use in call management. Inventive embodiments of the telephone interface systems include at least one communication device, at least one microprocessor-driven automated electronic device, at least one communication network, and at least one interface device. Embodiments of the present invention are intended for various functional uses, including but not limited to, call screening, automated phone assistance, and emergency notification. Some embodiments of the inventive system are custom tailored to the needs of individuals with mental and physical handicaps. By way of example, and not limited to the particular suggestions, the system may allow for communication with wired or wireless devices, Internet connection capabilities, Wi-Fi, Bluetooth connectivity, touch displays, customized dial pads, and user instruction adaptability.

Embodiments of the inventive system may be made from any material known in the art, and nothing herein is intended to limit the materials with which the inventive system is to be made.

Communication Capabilities and Settings

Embodiments of the present invention provide for systems with communication devices that may be wireless, wired, or a combination of both. The communication devices allow for communication between wireless and wired devices in real-time via mobile communication networks. Any one or combination of these separate devices, combined into a single or plurality of systems, produce a means for real-time communication among the devices and other devices connected to the same network.

Further embodiments of the present invention provide for systems which provide one or more interface devices, which would be useful to virtually any individual or group of individuals, and is not limited to a single industry, profession, or age group. Embodiments of the interface devices are capable of monitoring incoming and outgoing calls against a preferred list of numbers, and are able to connect one or more communication devices to one or multiple communication networks if the number dials is present on the preferred list. If a number is not on the preferred list, embodiments of the present invention are capable of blocking such numbers.

In at least one embodiment of the present invention, the interface device requires a caller to respond to at least one affirmative response as a prerequisite of the interface device moving forward with connecting the call with the system user. Such affirmative responses include, but are not limited to, responding to voice prompts, silent prompts, or numeric entries.

Further, in at least one embodiment, the system user may set instructions for the interface device to limit ingoing and outgoing calls during particular times of the day.

Touch Screen Display

In at least one embodiment of the present invention, the system is compatible with at least one touch screen display. In some embodiments, the touch screen display may feature one or more icons that represent specific preferred phone numbers from a list of preferred numbers. Some embodiments may also feature customized dial pads that can be generally adjusted to individual preferences, but can also accommodate one or more users' mental or physical handicaps.

Emergency Response Communication

In at least one embodiment of the present invention's touch screen, there is at least one option for communication with emergency support. Emergency support communication includes, but is not limited to law enforcement, fire departments, emergency (911), and medical assistance. At least one embodiment is capable of accommodating one or more users' mental or physical handicaps.

Some embodiments of the inventive system include options for communicating with emergency support. These include, but at not limited to, graphical switches that require particular manipulation to prevent inadvertent selections.

Alerts and Third-Party Use

In at least one embodiment of the system, the interface device provides for mobile alerts or messages to at least one third-party user. Some embodiments of the interface device further allow system users to designate a caregiver as an authorized third-party user through user instructions.

Embodiments of the present invention also provide for alerts and messages to the system user. These alerts include, but at not limited to system status, numbers dialed by the system user, updates regarding numbers that called the system user, missed calls, missed messages, and alerts for when an emergency support button is selected or a connected sensor is activated.

User Interaction with, and Instructions for, System

In at least one embodiment of the present invention, the system user is able to provide instructions for the interface device. Such instructions include, but are not limited to, programming the interface device to connect to at least one telephone device, setting alert notification settings, authorizing third-parties to review alerts, and setting automated interface device answering settings.

Some embodiments may contain even more advanced instruction settings for user and device interaction. By way of example, and not limited to the particular suggestions, the user may define the success or failure of a predetermined status check through an automated phone call, pressing one or more dial-pad keys, or speaking in response to an automated message.

Further embodiments of the present inventive system also allow the user to provide the interface device with instructions to decline calls not on an approved number list or received outside of predetermined hours. Some embodiments may also allow the user to instruct the system to decline duplicate calls from numbers previously missed by the system user.

System Compatibility and Remote Connectivity

In at least one embodiment of the present invention, the interface device is equipped with sensors or actuators allowing for the interface device to connect, interface, or listen for third-party inputs. By way of example, and not limited to the particular suggestions, such connectivity may include security devices and home monitoring systems. Some embodiments may also be compatible with other devices, including, but not limited to, motion detectors, fire/smoke alarms, burglar alarms, motion detectors, warning lights and sirens, or wearable devices.

Further, at least one embodiment of the present invention is capable of being remotely monitored and reconfigured when connected to the Internet. Remote monitoring and reconfiguration may be performed by one or more authorized persons from various devices capable of accessing the Internet. Such devices include, but are not limited to, computers and mobile phones.

OTHER EMBODIMENTS

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The foregoing description is illustrative of particular embodiments of the invention, but is not meant to be a limitation upon the practice thereof. The following claims, including all equivalents thereof, are intended to define the scope of the invention.

The invention claimed is:

1. A telephone interface system, the system comprising:
   two or more communication devices, said communication devices being at least one wired telephone device and at least one microprocessor-driven wireless telephone device;
   one or more communications networks wherein said at least one microprocessor-driven wireless telephone device is in connection with said one or more communications networks; and
   one or more interface device in communication with said at least one microprocessor-driven wireless telephone device and said at least one wired telephone device for processing incoming calls from said at least one microprocessor-driven wireless telephone device and processing outgoing calls from said at least one wired telephone device;
   wherein said interface device further comprises a power supply, one or more processor for processing incoming and outgoing calls received from said at least one microprocessor-driven wireless telephone device, and an interface for connecting said one or more wired telephone device;
   wherein said interface device allows for telephonic communication via said one or more wired telephone device through said at least one microprocessor-driven wireless telephone device in connection with said one or more communications networks; and
   wherein said at least one processor of said interface device contains a non-transitory computer readable medium containing instructions, that when executed, perform the method of:
      monitoring incoming calls from said at least one microprocessor-driven wireless telephone device;
      monitoring outgoing calls from said at least one wired telephone device;
      wherein upon said interface device receiving an incoming call by said at least one microprocessor-driven wireless telephone device, said interface device answers said incoming call and prompts said incoming call to respond to at least one interactive prompt, said at least one interactive prompt being a voice prompt, a silent prompt, a numeric entry, a predetermined caller interaction, or combinations thereof;
      wherein upon said incoming call providing an affirmative response to said interactive prompt from said interface device, said interface device connects said incoming call from said at least one microprocessor-driven wireless telephone device to said at least one wired telephone device via the interface device; and
      wherein upon said incoming call providing an incorrect response to said interactive prompt, said interface device does not connect said incoming call from said at least one microprocessor-driven wireless telephone device to said at least one wired telephone device via the interface device.

2. The system of claim 1 wherein said one or more communications networks is a mobile communication network, an internet communication system, a wired telephone communication system (Public Switched Telephone Network), Wi-Fi, Bluetooth, or combinations thereof.

3. The system of claim 1 wherein said method further comprises:
   upon receiving an outgoing call from said at least one wired telephone device, monitoring the number dialed for said outgoing call against a user-defined preferred list of numbers;

wherein upon said number dialed on said at least one wired telephone device matches a number on said user-defined preferred list of numbers, connecting said at least one wired telephone device to said at least one microprocessor-driven wireless telephone device and dialing the number on said at least one microprocessor-driven wireless telephone device; and wherein upon said number dialed on said at least one wired telephone device does not match a number on said user-defined preferred list of numbers, preventing connecting of said at least one wired telephone device to said at least one microprocessor-driven wireless telephone device until a number dialed on said at least one wired telephone device matches a number on said user-defined preferred list of numbers.

4. The system of claim 1 wherein said method further comprises:
preventing connection of said incoming and outgoing calls during particular times of day defined by said user.

5. The system of claim 1 further comprising one or more touch screen displays.

6. The system of claim 5 wherein said touch screen display includes one or more icons representing one or more preferred numbers from said preferred list of numbers.

7. The system of claim 5 wherein said touch screen display includes at least one customized dial pad for use by at least one user to accommodate for said at least one users' mental or physical handicaps.

8. The system of claim 5 wherein said touch screen display includes one or more options for communicating with emergency support a police department, fire department, emergency (911), or medical assistance to accommodate for said at least one users' mental or physical handicaps.

9. The system of claim 8 wherein said options for communicating with emergency support include graphical switches which require particular manipulation to prevent inadvertent selection.

10. The system of claim 1, wherein said method further comprises providing mobile alerts or messages to one or more third party users.

11. The system of claim 10 wherein said mobile alerts or messages includes status alerts of said user and user's system, information related to numbers dialed by user, information related to numbers who called user, missed calls and/or messages related thereto, status alerts if one or more emergency support buttons are selected, or combinations thereof.

12. The system of claim 1 wherein said interface device further comprises of one or more sensors or actuators which connect, interface, or listen for third party input.

13. The system of claim 12 wherein said third party input is one or more fire/smoke alarm, one or more burglar alarm, one or more motion detector, one or more wearable device, or combinations thereof.

* * * * *